May 9, 1961
C. E. PRICE
2,983,529
BEARING SEALS
Filed April 10, 1958
3 Sheets-Sheet 1
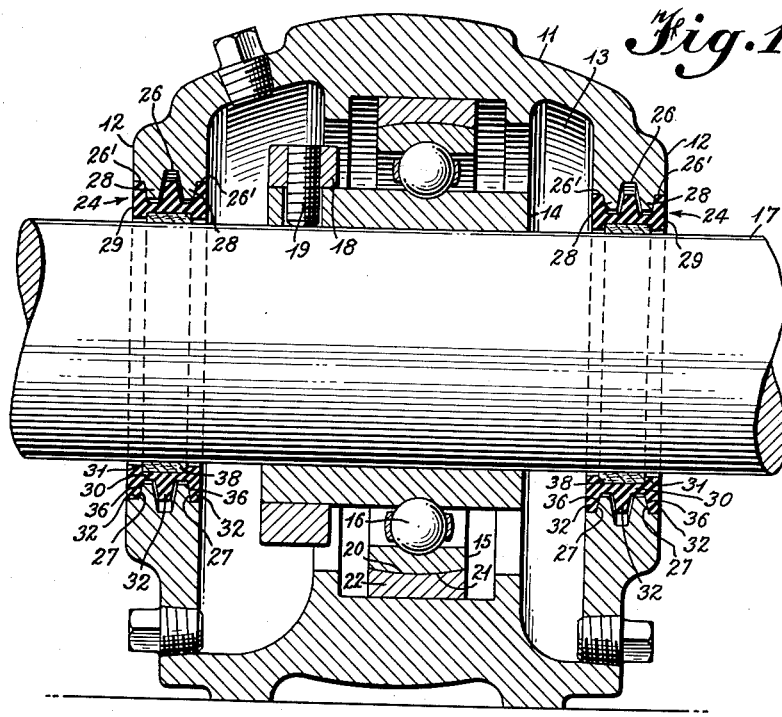
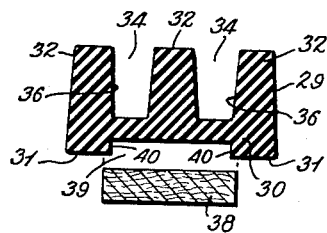
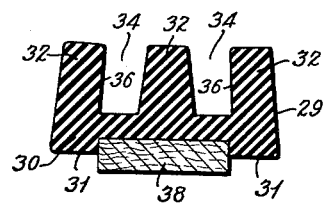
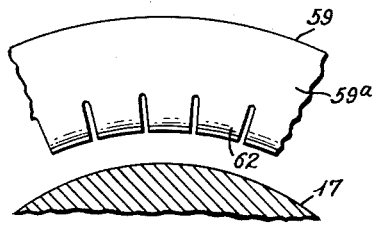
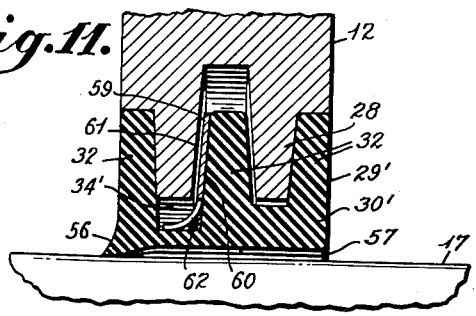

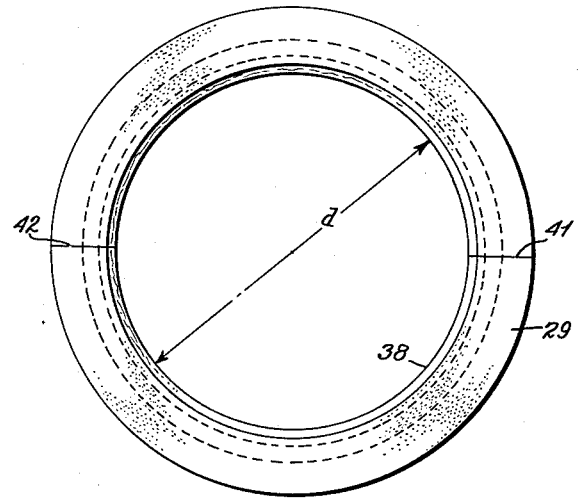
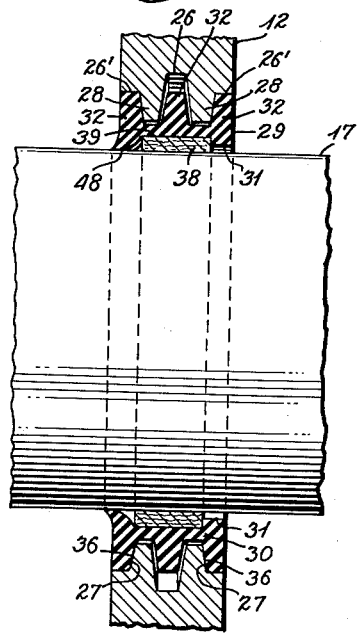
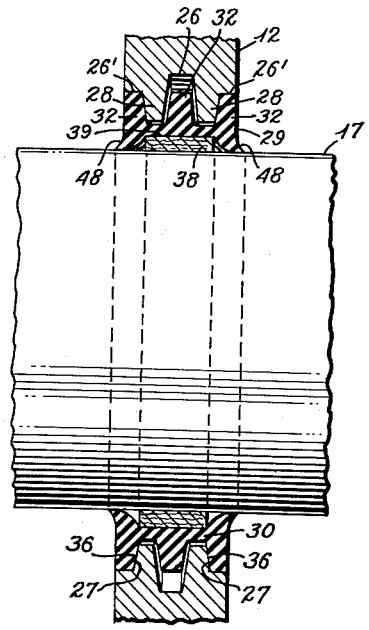

May 9, 1961

C. E. PRICE 2,983,529

BEARING SEALS

Filed April 10, 1958

3 Sheets-Sheet 3

United States Patent Office 2,983,529
Patented May 9, 1961

2,983,529

BEARING SEALS

Connor E. Price, Indianapolis, Ind., assignor to Link-Belt Company, a corporation of Illinois Filed Apr. 10, 1958, Ser. No. 727,561

12 Claims. (Cl. 286—5)

This invention relates to seals for closing the ends of the lubricant space, or chamber, between two relatively rotating concentric members to prevent the ingress of foreign matter and the egress of lubricant. More particularly, it relates to seals for pillow block bearing housings, or the like.

The primary object of this invention is to provide a seal of the foregoing character which is adapted to be secured to a bearing housing, or the like, in a manner which permits quick assembly and disassembly of the seal, and by which the seal is firmly retained in the housing when assembled so as to permit handling and shipping of the housing and seal as a unit.

A further object of this invention is to provide a seal of the foregoing character which yieldingly contacts the surface of a shaft, or other rotatable concentric member, journaled in the housing and which provides a tight seal that is maintained despite slight misalignment of the rotatable member in respect to the housing.

A more detailed object of the present invention is to provide a seal composed at least in part of an elastic material in which its inherent resiliency is utilized to effect a secure connection between such seal and a bearing housing without the aid of additional retaining or connecting elements.

Other objects and advantages of the invention will be apparent during the course of the following description.

Figure 7:
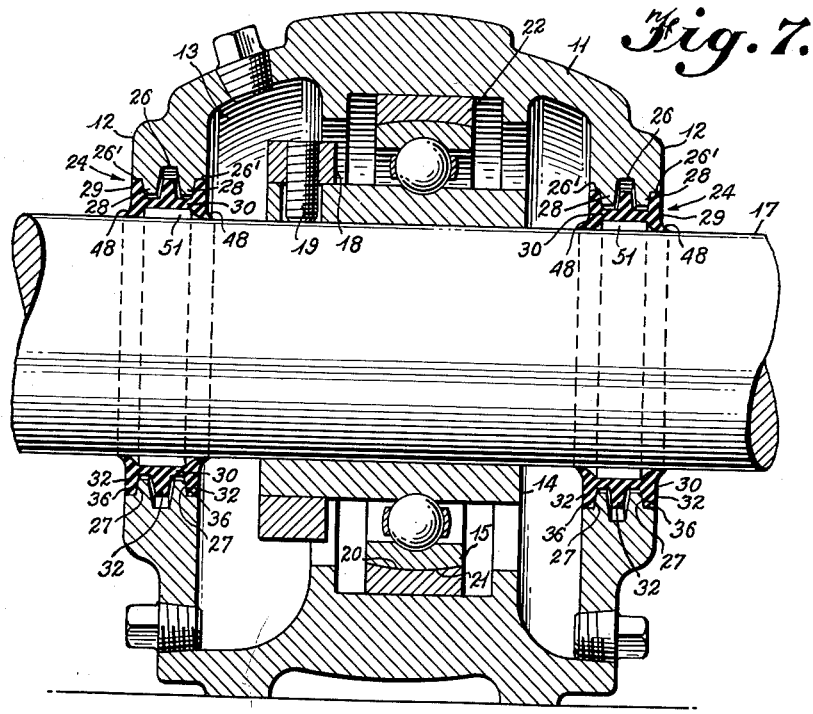

In the accompanying drawings forming a part of this specification and in which like reference characters are employed to designate like parts throughout the same, Figure 1 is a vertical sectional view through a pillow block bearing housing equipped with seals embodying one form of the present invention, Figure 2 is an enlarged detail sectional view through one of the seal structures illustrated in Fig. 1 showing the two component parts prior to being joined, Figure 3 is a similar view to Fig. 1 showing the same component parts after being joined and prior to being assembled in a bearing housing, Figure 4 is a side elevational view of the two joined component parts of the seal structure illustrated in Figs. 2 and 3, Figure 5 is an enlarged detail sectional view through an associated portion of a bearing housing showing a modified form of seal structure embodying the present invention, Figure 6 is a similar view to Fig. 5 but showing a still further modified form of seal structure embodying the present invention, Figure 7 is a vertical sectional view through a pillow block bearing housing equipped with seals embodying another form of the present invention, Figures 8, 9, 10 and 11 are similar views to Fig. 5 showing still further seal structures embodying the present invention, and Figure 12 is an enlarged detail fragmentary view of the spring employed in the seal structure of Fig. 11.

In the drawings, wherein for the purpose of illustration are shown the preferred embodiments of the invention, and first particulary referring to Fig. 1, one embodiment of the invention is incorporated in a pillow block bearing housing 11 which is formed with opposed end walls 12 that define therebetween a chamber 13 adapted to receive and retain bearing means. Such means may take the form of a self-aligning, antifriction bearing comprised of an inner race 14 and an outer race 15 maintained in spaced concentric relationship by a circumferential row of balls 16 disposed in opposed grooves formed in said races. The inner race 14 has a concentric bore for receiving a shaft 17 fitted therethrough, and is secured to such shaft by means of a retaining collar 18 and a set screw 19. The outer race 15 is provided with a spherical surface 20 which engages a corresponding spherical surface 21 of a retaining ring 22 to permit limited universal movement of the inner and outer races to compensate for slight misalignment of the shaft 17 with respect to the housing 11. It is to be understood, however, that the specific structure of the bearing means forms no part of the present invention, and that a roller bearing, or other conventional form of bearing, may be substituted for that shown without departing from the invention.

Each of the end walls 12 of the housing 11 is provided with a circular opening 24 which is so dimensioned as to define a housing bore radially spaced from the shaft 17 when the latter is journaled in the bearing.

In keeping with the invention, the margin of each one of the housing wall openings 24 is so shaped as to form two radially inwardly projecting, annular ribs 28 which are axially spaced from each other to form a deep center groove 26 and axially spaced inwardly from the outer surfaces of the wall 12 to form the shallower outside grooves 26'. The axially outer side faces 27 of the two ribs 28 are flat and are inclined, or beveled, so as to converge radially inwardly. Fitted in each opening 24 of each side wall 12 is a seal structure that functions in cooperation with the surface of the shaft 17 to prevent the admission of foreign matter into, or the escape of lubricant from, the bearing chamber 13.

The seal structure embodying the invention and illustrated in Figs. 1 to 4, inclusively, comprises an elastomeric ring 29 formed with a main body portion 30 from the periphery of which project three circumferentially extending ribs 32 which are spaced axially from each other to provide two annular grooves 34 therebetween. As seen in Fig. 2, the ring 29 is initially shaped with the axially inner side faces 36 of the two outer ribs flat and slightly inclined, or beveled, so as to diverge radially outwardly with respect to each other. The normal spacing of the two side faces 36 of the ribs 32 is such that when the ring 29 is fitted in an opening 24 of the housing wall 12, the side faces 36 of the ribs 32 will frictionally grip the outer faces 27 of the said housing wall opening 24.

Projecting radially inwardly from the bore of the ring body portion 30 are two marginal flanges 31 which are spaced from each other to form a groove 39 that is defined at its sides by the radial walls 40.

The seal structure is completed by a ring 38 which is formed of felt, or other fibrous material, and positioned within the groove 39. To aid in retaining the felt ring 38 in the groove 39 of the elastomeric ring 29, the two rings may be adhesively bonded together. In addition to the adhesive bonding, or as an alternative thereto, the axial dimension, or width, of the felt ring 38 may be made greater than the width of the groove 39, or the space between the radial walls 40 of the flanges 31, causing the flanges to resiliently grip the felt ring when the seal structure is fully assembled. Also, in connection with the latter situation, it will be noted that, when the flanges 31 are spread apart by the felt ring 38, the ribs 32 tend to be forced toward each other, as seen in Fig. 3; and, when the seal structure is positioned in an opening 24 of the housing wall in its fully assembled condition, the faces 36 of the ribs 32 thereby will be caused to more tightly, frictionally grip the outer side faces 27 of the housing wall ribs 28 and thus more securely fasten the seal structure to the housing wall 12.

The pillow block housing may be formed in one piece or it may be split into two pieces. The two rings 29 and 38 of the seal structure, also, may each be formed of one piece or they may be cut at the two diametrical locations 41 and 42, shown in Fig. 4. This latter construction may be found to be more convenient for use in connection with split housings. In Fig. 4, the inside diameter of the seal structure is represented by the character "d." It is to be understood that this dimension of all of the seal structures embodying this invention is less than the outside diameter of the shaft 17 so that all of the seal structures will be placed under radial compression between the periphery of the shaft and the bore of the associated housing wall opening 24. When the seal structure is split, as in Fig. 4, and such structure includes both a felt ring 38 and an elastomeric ring, as in the structures to be described in connection with Figs. 5 and 6, it may be desirable to adhesively bond the two rings together.

Referring now to the modifications of the invention illustrated in Figs. 5 to 10, inclusive, it will be seen that the form and arrangement of the various ribs employed in securing the seal structures to the housing is identical to that illustrated in Figs. 1 to 4 and the same reference characters have been applied to corresponding parts. That is to say, the surfaces 36 of the ribs 32 are so positioned as to frictionally grip the surfaces 27 of the ribs 28. The portion of the seal structure which extends radially inwardly from the body portion 30 of the ring member 29 has been modified, however, and will be described in detail as follows:

The seal structure of Fig. 5 differs from the structure of Figs. 1 to 4 primarily by having the marginal flange 48 feathered or tapered and extended a greater distance radially inwardly to have sealing contact with the surface of the shaft in addition to the felt ring 38. The remainder of the groove 39 and the single remaining marginal flange 31 are the same as in the modification of Figs. 1 to 4 and are intended to accommodate the felt ring 38 which, as indicated above, may be adhesively secured in place.

The seal structure of Fig. 6 differs from the structure of Fig. 5 only by having a second, feathered marginal flange 48 substituted for the single remaining flange 31. In this embodiment the felt ring 38 is still employed and may be adhesively secured to the main body portion 30 of the ring 29.

In the embodiment of the invention illustrated in Fig. 7, the elastomeric ring 29 is formed the same as illustrated in Fig. 6 but the felt ring 38 is omitted and the annular groove 51, in cooperation with the surface of the shaft 17, forms a chamber to receive a lubricant, such as grease.

Figure 8:
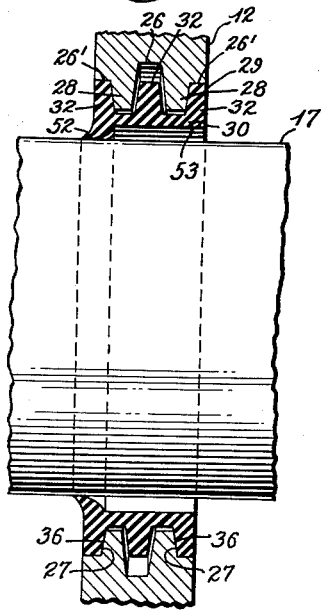

The seal structure of Fig. 8 is the same as those shown above through the main body portion 30, but between the latter and the surface of the shaft 17, there is provided only one feathered flange 52, and the remainder of the groove 53 is unoccupied by any part of the seal structure. Of course, the lubricant for the bearing, be it oil or grease, will fill this space if the seal structure is placed in the housing 11 with the flange 52 facing toward the outside of the housing.

Figure 9:
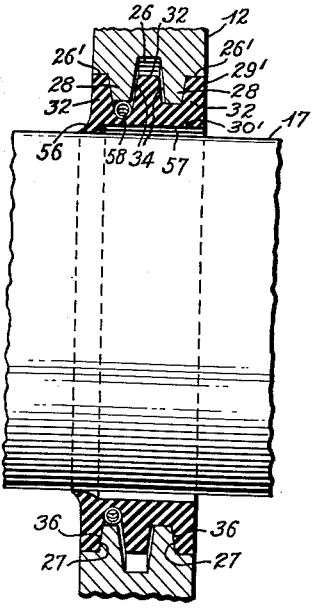

Is Figs. 9 and 11, there are illustrated seal structures in which the construction of the elastomeric ring 29' is modified to the extent that the main body portion 30' is made thicker radially so that one of the grooves 34' may be made deep enough to receive a spring means which presses against the bottom of the said groove. This spring means functions to compress the feathered flange 56 into sealing engagement with the surface of the shaft 17. Because of the increased thickness of the body portion 30', the lubricant grooves 57 is reduced in radial dimension as compared with the groove 53 in Fig. 8.

In the seal structure of Fig. 9 the spring means is shown to take the form of a garter spring 58 disposed in the bottom of the groove 34' and under the corresponding housing rib 28.

In the seal structure of Fig. 11 the spring means takes the form of a finger spring 59 having a body portion 59a positioned between a radial wall 60 of one of the housing ribs 28 and a corresponding radial wall 61 of one of the seal ribs 32. A plurality of curved finger elements 62, Fig. 12, extend radially inwardly from the body portion 59a of the spring 59, engage the bottom of the groove 34', and apply a resilient force to the bottom of the groove 34' to compress the feathered flange 56 against the shaft 17.

Figure 10:
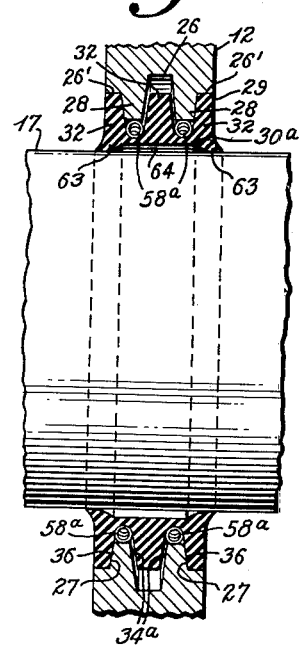

The embodiment of the invention illustrated in Fig. 10 is a further development of the structures shown in Figs. 9 and 11. The body portion 30a, also, is thicker like the corresponding portion 30' in the Fig. 9 and 11 structures and both of the grooves 34a are made deep enough to receive two spring means. These two spring means function to compress the two feathered flanges 63 into sealing engagement with the surface of the shaft 17 so as to seal off the groove 64 for the reception of a charge of grease, or other lubricant. As illustrated in Fig. 10, each of the two spring means may be garter springs such as indicated by the reference character 59a. However, it is to be understood that each spring means may also comprise a finger spring, as shown in Fig. 12, or any other conventional type of spring.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. The combination with a housing having an end wall opening with its margin shaped to form two axially spaced annular ribs providing two annular surfaces facing axially outwardly in opposite directions, said ribs being spaced axially inwardly of the opposite faces of said end wall to provide grooves outwardly of said ribs, of a seal structure positioned in said end wall opening, said seal structure comprising an elastomeric ring having a main body with an inner annular surface, two radially outwardly extending axially spaced annular ribs integral with said ring body providing two seal surfaces facing axially inwardly toward each other to frictionally grip the two annular surfaces of said housing ribs, the outer peripheries of said outwardly extending ribs being seated against the bottoms of said grooves and the portion of said ring body between said outwardly extending ribs being radially spaced from the margin of said end wall opening to permit radial flexing of said ring body portion, and radially yieldable means on said ring body extending radially inwardly of its said inner annular surface at a location that is spaced axially from said outwardly extending ribs to provide wiping engagement with a shaft to close the space between said ring body and the shaft.

2. The combination of claim 1 further characterized by said radially yieldable means comprising a flange feathered in cross section and flexed into flat surface wiping engagement with said shaft.

3. The combination of claim 2 further characterized by spring means encircling the main body portion of said elastomeric ring for flexing said feathered flange into engagement with the said shaft.

4. The combination of claim 3 further characterized by said spring means consisting of a garter spring.

5. The combination of claim 1 further characterized by said radially yieldable means comprising two axially spaced flanges feathered in cross section in the direction of said shaft and flexed into wiping engagement with said shaft to form a lubricant receiving groove.

6. The combination of claim 5 further characterized by spring means encircling the main body portion of said elastomeric ring for flexing both of said feathered flanges into engagement with said shaft.

7. The combination of claim 6 further characterized by the spring means consisting of a garter spring operatively associated with each of said two feathered flanges.

8. The combination with a housing having an end wall formed with an opening, the margin of said opening being formed to provide a radially inwardly and axially outwardly facing groove at each side of the wall, of a seal structure positioned in said end wall opening, said seal structure comprising an elastomeric ring including a main body portion having an inner annular surface, a ring of fibrous material carried by said main body portion and extending inwardly therefrom for wiping engagement with a shaft positioned in said end wall opening and for closing the space between said main body portion and said shaft, and means integral with said main body portion and spaced axially outwardly of said fibrous ring for frictionally gripping the outwardly facing portion of each groove, said integral means being in engagement with the inwardly facing portion of each groove, and the portion of said body extending axially between said integral means being spaced radially from the margin of said opening to permit radial flexure of said fibrous ring.

9. The combination of claim 8 further characterized by said main body portion having two axially spaced integral flanges, between which said fibrous ring is positioned, projecting toward the surface of said shaft.

10. The combination of claim 9 further characterized by at least one of said integral flanges being feathered in cross section and flexed into wiping engagement with said shaft.

11. The combination with a housing having an end wall opening with its margin shaped to form two axially spaced annular ribs providing two axially outwardly facing surfaces, said ribs being spaced axially inwardly of the opposite faces of said end wall to provide grooves outwardly of said ribs, of a seal structure positioned in said end wall opening, said seal structure comprising an elastomeric ring including a main body portion having an inner annular surface, two axially spaced flanges integral with said ring body portion and projecting radially inwardly from said annular surface, a ring of fibrous material positioned between said flanges and extending inwardly from said annular surface for wiping contact with a shaft positioned in said end wall opening, and two radially outwardly extending axially spaced annular ribs integral with said ring body portion providing two axially inwardly facing surfaces adapted to engage and frictionally grip said outwardly facing surfaces of said annular ribs of said housing opening, the outer peripheries of said outwardly extending ribs being seated against the bottoms of said grooves and the portion of said main body between said outwardly extending ribs being radially spaced from the margin of said end wall opening to permit radial flexing of said main body portion, the axial dimension of said fibrous ring being greater than the axial spacing of said elastomeric ring flanges so that said fibrous ring is gripped and held in place by said ring flanges and said inwardly facing surfaces of said two annular ring ribs are urged toward each other and into tighter engagement with the axially outwardly facing surfaces of the annular ribs of said end wall opening.

12. The combination comprising a housing having an opening therein for receiving a shaft, rib means formed about the margin of said opening defining two axially spaced annular housing surfaces facing axially outwardly in opposite directions, said ribs being spaced axially inwardly of the opposite faces of said housing to provide grooves outwardly of said ribs, and a seal structure positioned in said opening, said seal structure comprising an elastomeric ring having a main body portion, two axially spaced radially inwardly extending flanges integral with said main body portion, a fibrous ring positioned between said flanges and extending radially inwardly thereof for wiping engagement with a shaft, and means integral with said main ring body portion defining two axially spaced annular seal surfaces facing generally axially toward one another with each engaging a respective one of said groove surfaces so as to grip said rib means between said two seal surfaces, said integral means being in engagement with the bottoms of said grooves and the portion of said body extending axially between said integral means being spaced radially from the margin of said opening to permit radial flexure of said ring, the axial dimension of said fibrous ring being greater than the axial spacing of said ring flanges to cause said ring flanges to be held in a spread apart condition by said fibrous ring and said fibrous ring to be gripped and held in place by said ring flanges, and said main body portion being sufficiently thin in its radial dimension that a spreading apart of said flanges causes said two seal surfaces to be urged towards each other to grip more tightly said housing opening rib means.

References Cited in the file of this patent

UNITED STATES PATENTS

| | | |
|---|---|---|
| 980,671 | Price | Jan. 3, 1911 |
| 1,891,285 | Loewus | Dec. 20, 1932 |
| 2,074,672 | Rogers | Mar. 23, 1937 |
| 2,368,380 | Ruzacka | Jan. 30, 1945 |
| 2,804,358 | Eriksson | Aug. 27, 1957 |
| 2,850,311 | Mansfield | Sept. 2, 1958 |